(12) United States Patent
Dotan et al.

(10) Patent No.: US 8,825,848 B1
(45) Date of Patent: Sep. 2, 2014

(54) ORDERING OF EVENT RECORDS IN AN ELECTRONIC SYSTEM FOR FORENSIC ANALYSIS

(75) Inventors: Yedidya Dotan, Tel Aviv (IL); Assaf Natanzon, Tel Aviv (IL); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 146 days.

(21) Appl. No.: 13/424,955

(22) Filed: Mar. 20, 2012

(51) Int. Cl.
*G06F 15/173* (2006.01)

(52) U.S. Cl.
USPC .......................................... 709/224; 709/223

(58) Field of Classification Search
USPC ............................................... 709/224, 223
See application file for complete search history.

(56) References Cited

U.S. PATENT DOCUMENTS

| | | | | |
|---|---|---|---|---|
| 5,432,781 A * | 7/1995 | Nimon | .................... | 370/427 |
| 6,574,665 B1 * | 6/2003 | Khotimsky | ................ | 709/224 |
| 7,516,287 B2 | 4/2009 | Ahal et al. | | |
| 7,577,867 B2 | 8/2009 | Lewin et al. | | |
| 7,627,612 B2 | 12/2009 | Ahal et al. | | |
| 7,627,687 B2 | 12/2009 | Ahal et al. | | |
| 7,634,557 B2 | 12/2009 | Moore et al. | | |
| 7,739,689 B1 * | 6/2010 | Spertus et al. | ............... | 719/317 |
| 7,774,565 B2 | 8/2010 | Lewin et al. | | |
| 7,873,717 B1 * | 1/2011 | Woolway | .................... | 709/223 |
| 8,352,523 B1 * | 1/2013 | Sim-Tang | ..................... | 707/829 |
| 2003/0149744 A1 * | 8/2003 | Bierre et al. | ................. | 709/217 |
| 2004/0260733 A1 * | 12/2004 | Adelstein et al. | ............. | 707/202 |
| 2005/0183143 A1 * | 8/2005 | Anderholm et al. | ........... | 726/22 |
| 2007/0169192 A1 * | 7/2007 | Main et al. | ..................... | 726/22 |
| 2008/0256138 A1 * | 10/2008 | Sim-Tang | ..................... | 707/202 |
| 2009/0067443 A1 | 3/2009 | Moore et al. | | |
| 2009/0158430 A1 | 6/2009 | Borders | | |
| 2009/0164522 A1 * | 6/2009 | Fahey | ........................ | 707/104.1 |
| 2010/0002704 A1 | 1/2010 | Moore et al. | | |
| 2010/0070470 A1 * | 3/2010 | Milencovici et al. | ......... | 707/610 |
| 2010/0146124 A1 * | 6/2010 | Schauser et al. | .............. | 709/226 |
| 2010/0211826 A1 * | 8/2010 | Villella et al. | .................. | 714/39 |
| 2010/0281543 A1 | 11/2010 | Golomb et al. | | |
| 2010/0332451 A1 * | 12/2010 | Vosshall et al. | ............... | 707/634 |
| 2011/0055637 A1 * | 3/2011 | Clemm et al. | .................. | 714/39 |
| 2011/0153748 A1 * | 6/2011 | Lee et al. | ...................... | 709/205 |
| 2011/0185280 A1 * | 7/2011 | Nakash et al. | ................ | 715/736 |
| 2012/0209983 A1 * | 8/2012 | Bronner et al. | ............... | 709/224 |
| 2012/0278473 A1 * | 11/2012 | Griffiths | ........................ | 709/224 |
| 2012/0303910 A1 * | 11/2012 | Ma | .................................. | 711/154 |
| 2013/0117272 A1 * | 5/2013 | Barga et al. | ................... | 707/741 |
| 2013/0238584 A1 * | 9/2013 | Hendry | ......................... | 707/706 |

OTHER PUBLICATIONS

"Vector Clock," from Wikipedia, downloaded from http://en.wikipedia.org/wiki/Vector_clock, downloaded on Sep. 28, 2012.

* cited by examiner

*Primary Examiner* — Waseem Ashraf

(74) *Attorney, Agent, or Firm* — BainwoodHuang

(57) ABSTRACT

An improved technique for logging events in an electronic system for forensic analysis includes receiving event records by a recording unit from different forensic agents of the electronic system and applying timing information included within the event records to resequence the event records in the recording unit in a more accurate order. In some examples, the timing information includes a vector clock established among the agents of the electronic system for storing sequences of events. The vector clock provides sequence information about particular events occurring among the forensic agents, which is applied to correct the order of reported event records. In other examples, the timing information includes timestamps published to the agents from a common timestamp server. In yet other examples, the timing information includes timestamps of the devices on which the agents are running, or any combination of the foregoing examples of timing information.

20 Claims, 5 Drawing Sheets

ORDERING OF EVENT RECORDS IN AN ELECTRONIC SYSTEM FOR FORENSIC ANALYSIS

BACKGROUND

Electronic systems, such as computers or groups of computers, often provide log files for storing information related to various computing activities. Log files are conventionally used by processes running on a computer to report events that the processes have performed or detected. In a typical scenario, processes running on a computer obtain timestamps from the computer and append the timestamps to event records written to the log file.

With event records written to a log file in this manner, users can access the log file to view events along a common timeline. For example, users may be able to view the log file to observe sequences of computing events occurring across different portions of a computer.

Forensic analysis tools often employ log files to identify events leading up to and following suspect activity. For example, RSA, the security division of EMC Corporation of Hopkinton, Mass., provides a forensic suite of tools called NetWitness, which, in addition to many other functions, creates log files relating to network activities and analyzes the log files to obtain forensic information about malicious network behavior.

SUMMARY

Unfortunately, errors can arise in the timestamps written to log files. It is observed, for example, that the writing of an event record to a log file is delayed relative to the event on which the log entry is based, and that delays can be variable. The writing of log entries can be variably delayed by several factors, including, for example, queuing delays, interrupts from other processes, context switching delays, and network delays. In some instances, the variability of delays can be sufficiently large that events records may be posted to a log file out of sequence, with earlier-occurring events having later timestamps than later-occurring events.

Also, it is desirable to analyze log entries across different devices, such as different computers, units, or assemblies. The devices may be physical devices or virtual devices, such as virtual machines or virtual networks. Each device generally has its own clock and stores log entries in its own log file with timestamps relative to the respective device's clock. Clocks of different devices may typically drift relative to one another. In such systems, when observing log entries across multiple devices, the timestamps applied in the respective log files have limited utility, as differences between device clocks create difficulties in tracing the propagation of related events among different devices.

Where it is desired to perform forensic analysis, errors in timestamps stored in log files may interfere with a forensic tool's ability to trace events. Timing errors in log files may conceal critical information about the precise order of events occurring within an electronic system. Forensic tools may therefore be prevented from accurately inferring cause and effect among events and tracing the propagation of malicious activity throughout the electronic system.

In contrast with the conventional approach to logging events, which can report events in erroneous order, an improved technique for logging events in an electronic system includes receiving event records by a recording unit from different forensic agents of the electronic system and applying timing information included within the event records to resequence the event records in the recording unit in a more accurate order. In some examples, the timing information includes a vector clock established among the agents for storing sequences of events. The vector clock provides sequence information about particular events occurring among the forensic agents, which is applied to correct the order of reported event records. In other examples, the timing information includes timestamps published to the agents from a common timestamp server. In yet other examples, the timing information includes timestamps of the devices on which the agents are running, or any combination of the foregoing examples of timing information. By resequencing the event records received by the recording unit, the improved technique enables more accurate and effective forensic analysis of events, particularly those arising from different devices or locations of an electronic system.

In some examples, a set of forensic agents are positioned across a diverse set of locations of an electronic system. The forensic agents may include network agents and storage agents, for example. Network agents monitor network activity of the electronic system and report the activity to the recording unit. Storage agents monitor storage activity and report the activity to the recording unit. In some examples, the storage agents include both memory agents and disk agents, for monitoring and reporting memory and disk activity, respectively. By correcting timing errors between log entries of network activity and storage activity, more accurate forensic analysis can be performed on events occurring across network and storage domains.

In certain embodiments, a method of ordering events captured by multiple forensic agents running in an electronic system includes receiving, by a recording unit of the electronic system, multiple event records from the forensic agents. Each event record includes a set of timing information provided by the respective agent. The method further includes storing the event records in the recording unit in the order received and resequencing the event records received by the recording unit based on the sets of timing information received from the forensic agents to at least partially reconstruct an order of events described in the event records across the forensic agents. The method still further includes storing the resequenced event records in the recording unit.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWING

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

An improved technique for logging events in an electronic system includes receiving event records by a recording unit from different forensic agents of the electronic system and applying timing information included with the event records to resequence the event records in the recording unit in a more accurate order. By resequencing the event records received by the recording unit, the improved technique allows more accurate and effective forensic analysis of events, particularly those arising from different devices, portions, or locations of an electronic system.

Particular embodiments will now be disclosed. It is understood that these embodiments are included by way of example and are not intended as limiting the manner in which the improvements hereof may be practiced.

Figure 1:
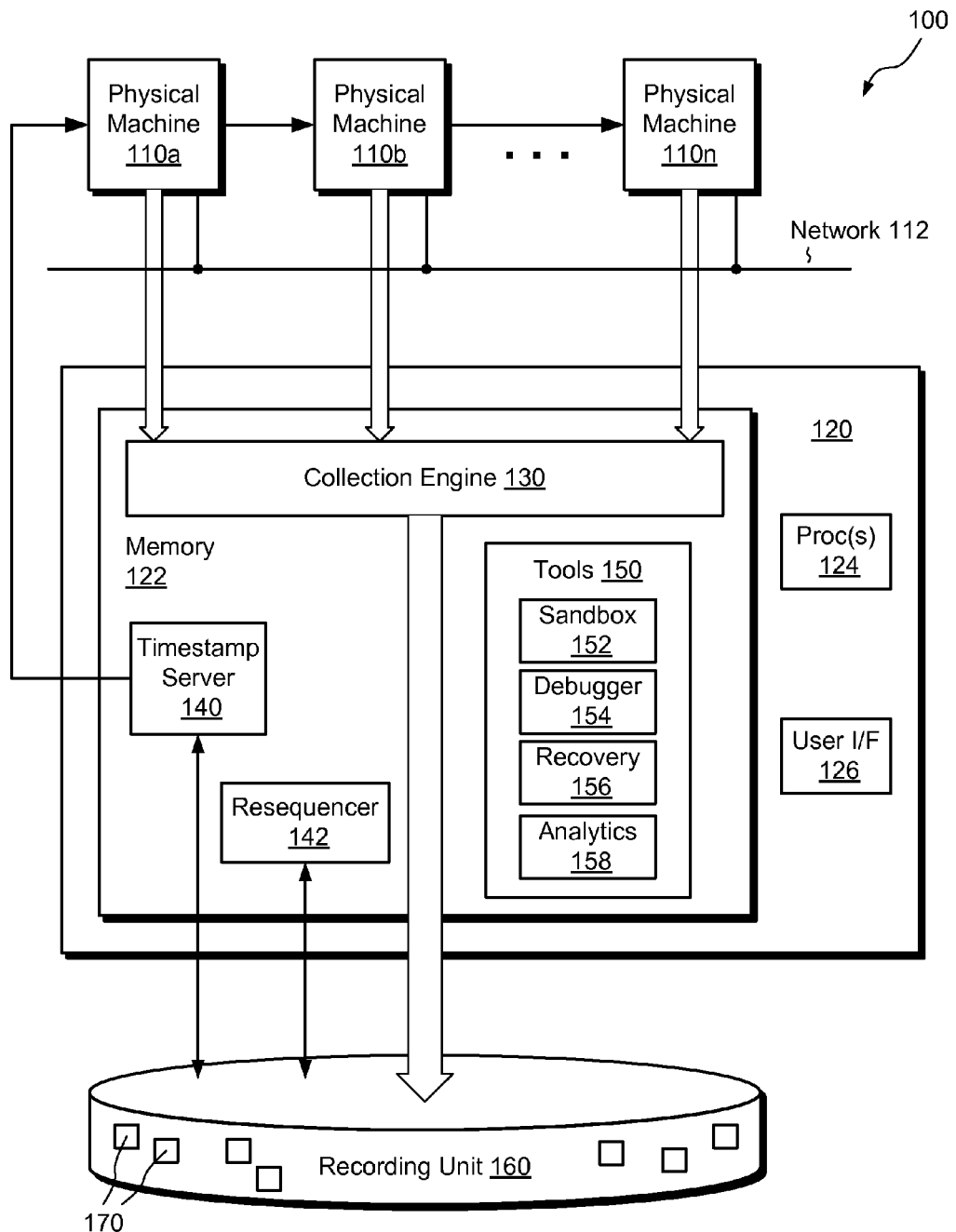
FIG. 1 is block diagram of an example electronic system in which improved techniques for logging event records is implemented.

FIG. 1 shows an example electronic system 100 in which system events, such as network activities and storage activities, are collected and resequenced for forensic analysis. The electronic system 100 is seen to include a number of physical machines, 110a-110n, a network 112, a computing system 120, and a recording unit 160. The computing system 120 includes memory 122, a set of processors 124 (i.e., one or more processing chips and/or assemblies), and a user interface 126, such as a keyboard, pointer, and display. The memory 122 may include both volatile and non-volatile memory. The network 112 may include a physical network, such as a Local Area Network (LAN), a Wide Area Network (WAN), a virtual network, the Internet, some other network, or any combination of the foregoing, for example. The physical machines 110a-n are generally computers, such as server-grade computers, although they may be any type of computer or computing device. Any number of physical machines 110a-n may be provided. Each of the physical machines 110a-n may run an operating system. One or more of the physical machines 110a-n may be configured as a virtual machine platform for running virtual machines.

The memory 122 of the computing system 120 includes software constructs, such as a collection engine 130, a timestamp server 140, a resequencer 142, and tools 150, for example. The tools 150 may include a sandbox 152, a debugger 154, a recovery interface 156, and various analytic tools 158 for assisting with forensic investigations. It is understood that the set of processors 124 and memory 122 can be regarded as a specialized circuit for performing the various functions and methods described herein.

In operation, the physical machines 110a-n perform a variety of computing activities. For example, users may log on to the physical machines 110a-n, or to the virtual machines they may contain, to run programs, use the Internet, read their email, and so forth. As the physical machines 110a-n operate, they perform network activities over the network 112 and storage activities with local memory and/or disk. Within the physical machines 110a-n, forensic agents monitor network and storage activities and create event records of the activities they monitor. The event records of network and storage activities are gathered and sent to the collection engine 130. The collection engine 130 writes the event records to the recording unit 160.

Event records may be stored in the recording unit 160 in any suitable way. In one example, data collections 170 are used to store event records. Each data collection 170 stores event records for a single machine instance, where a "machine instance" is a virtual machine instance or a physical machine instance from among the physical machines 110a-n. Once a data collection 170 is created for a machine instance, it can be maintained indefinitely, even after the machine instance itself ceases to exist.

In some examples, event records flow into the recording unit 160 in three separate streams: a network stream, a memory stream, and a disk stream. The collection engine 130 operates in coordination with forensic agents running on the physical machines 110a-n to gather these activities for each machine instance running on the physical machines 110a-n and to store the activities in the recording unit 160.

In some examples, the timestamp server 140 applies regular timestamps to the recording unit 160 to help synchronize the different streams of arriving event records. For example, each record entry stored in the recording unit 160 can be assigned to a particular time block, with each time block defined as an interval between two consecutive timestamps from the timestamp server 140. In some examples, the timestamp server 140 also publishes regular timestamps to the forensic agents (e.g., within the physical machines 110a-n). The timestamps received by the forensic agents can be applied to further assist in synchronizing events among different forensic agents.

Preferably, the timestamp server 140 sends timestamps to the recording unit 160 and/or the forensic agents via a broadcast protocol, such as UDP. Timestamps are therefore preferably "pushed" to the recording unit 160 and/or forensic agents. In some examples, the recording unit 160 can also request timestamps from the timestamp server 140 (e.g., using a "pull" protocol).

Event records are generally stored in the recording unit 160 in the order they are received. Although event records are preferably assigned to time slots relative to timestamps from the timestamp server 140, the timing event records logged to the recording unit is generally imprecise. For example, event records may encounter variable delays en route to the recording unit 160 due to queuing delays, context switching, network delays, and other delays. To correct for errors in the timing of event records, including their sequence, the resequencer 142 reads event records from the recording unit and applies one or more sorting algorithms to reorder event records and/or correct timing errors. Reordered event records are then written back to the recording unit 160.

Once event records of network, memory, and disk events have been collected and resequenced, a user or computer program may examine the records using the forensic tools 150. For example, forensic experts may wish to open the sandbox 152 to examine a previous state of one or more machine instances that are believed to have been infected or otherwise subjected to malicious or suspect activity. The sandbox 152 provides a safe, contained environment for replaying malicious events without putting the computing system 120 or any of the physical machines 110a-n (or the virtual machines they may contain) at risk. Similarly, users may wish to invoke the debugger 154 to step forward or backward through different machine states, such as in an effort to trace the propagation of malicious activity or corruption through the network, memory, and/or disk activities of a machine instance. Users may invoke the recovery interface 156 to select machines or even servers at a particular point in time to recreate them for research. Analytics 158 may be applied as well, such as queries of the data collections 170, correlation analyses among records from different domains, and other statistical analyses.

In some implementations, the computing system 120 is a storage processor, such as may be obtained from EMC Corporation of Hopkinton, Mass. The storage processor may include a multipathing driver for providing high speed, parallel storage operations to the recording unit 160. The recording unit 160 may itself be implemented with a number of logical storage units (LUNs), which may include multiple physical units. Alternatively, the recording unit may be implemented with a Greenplum® Data Computing Appliance (DCA), which may be obtained from EMC Corporation of Hopkinton, Mass.

In some implementations, the constructs of the electronic system 100 may be distributed differently than as shown among different computing systems and hardware. For example, the timestamp server 140 and/or tools 150 may be provided outside the computing system 120.

Also, it is envisaged that large scale installations may include hundreds or thousands of physical machines 110*a-n* housing an even greater number of virtual machines. In these instances, multiple computing machines 120 and recording units 160 may be provided. Preferably, however, all such storage units 160 receive a common timing reference from a single timestamp server 140, to allow synchronization of activities across the entire installation.

Figure 2:
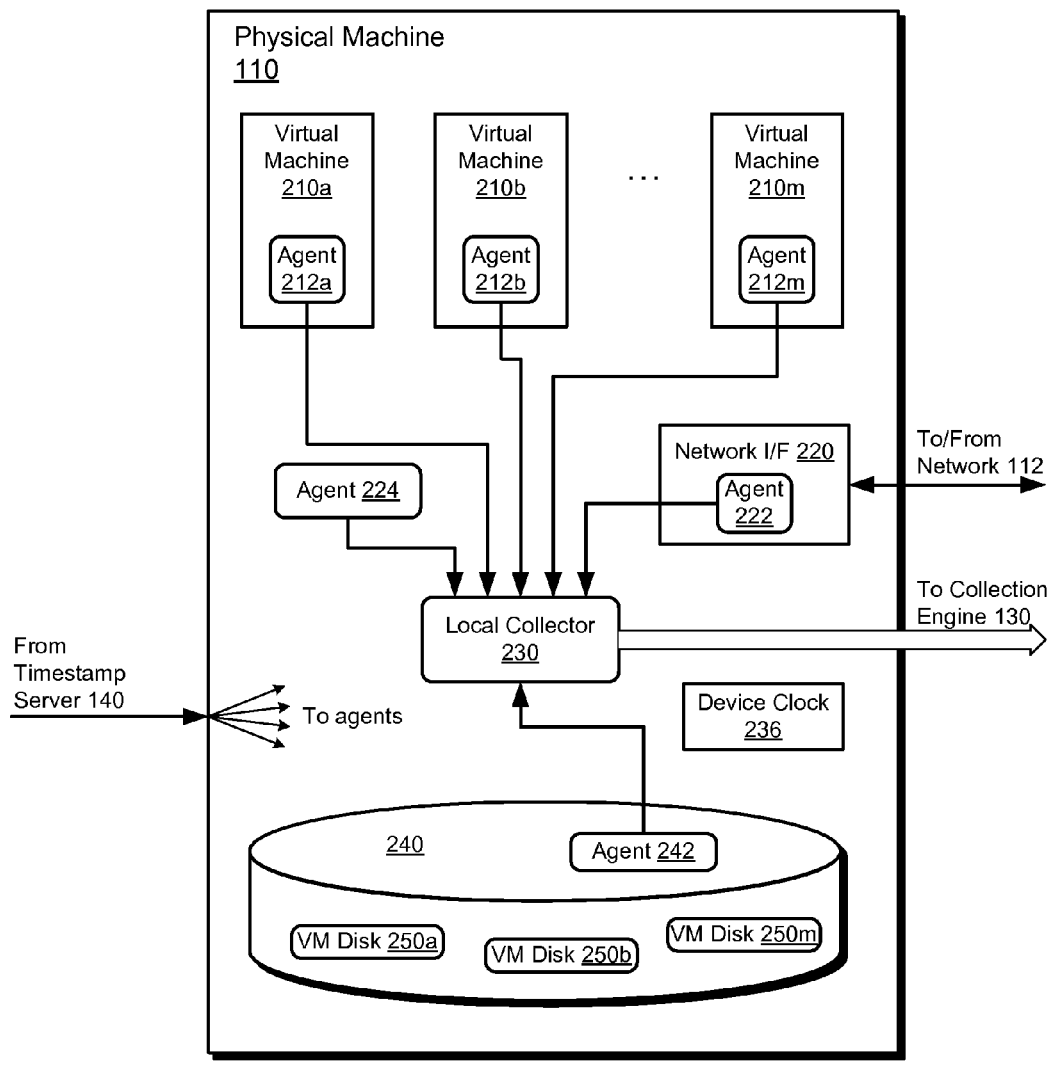
FIG. 2 is a block diagram of an example physical machine of FIG. 1 that includes multiple agents for detecting and reporting event records.

FIG. 2 shows an example physical machine 110, which may be typical of any of the physical machines 110*a-n*. Here, it is seen that the physical machine 110 is a virtual machine platform including virtual machines 210*a-m*, a network interface 220, a device clock 236, a local collector 230, and a disk array 240. The disk array 240 may include virtual machine disks 250*a-m*, i.e., one for each virtual machine 212*a-m*. In one example, the physical machine 110 is a server running the ESXi hypervisor, which is available from VMWare® of Palo Alto, Calif.

The physical machine 110 may include a number of forensic agents. For example, agents 212*a-m* may be provided, one for each virtual machine 210*a-m*. Also, an agent 222 may be provided for the network interface 220, an agent 242 may be provided for the disk array 240, and an agent 224 may be provided outside any of the virtual machines 210*a-m*. The agent 224 may be installed, for example, in the guest services area of the physical machine 110. A greater or lesser number of forensic agents may be provided. For example, the agents 212*a-m* may be omitted where their activity would excessively burden the respective virtual machines 210*a-m*.

In some examples, each agent 212*a-m*, 222, 224, and 242 receives timestamps from the timestamp server 140. Therefore, each agent shares a common time reference with other agents, both within the physical machine 110 and within others of the physical machines 110*a-n*. In addition, each agent 212*a-m*, 222, 224, and 242 may receive local time from the device clock 236. It is understood that the time reported by the device clock 236 typically will not match the time reported by the timestamp server, and that device clocks 236 on different physical machines 110*a-n* typically will not match one another.

In some examples, each forensic agent monitors the physical machine 110 for network, memory, and/or disk activities. For instance, the agent 222 may monitor only network activities, whereas the agent 242 may monitor only disk activities. Agent 224 may monitor only memory activities, or any combination of network, memory, and disk activities. It is desirable to have some level of redundancy among agents, such that multiple agents monitor the same activities from different vantage points. Redundant monitoring of activities helps to isolate malicious or suspect occurrences, such as when two agents monitoring the same activities report different results. Some agents may provide context-sensitive information (e.g., Data Loss Prevention (DLP) agents may be used), thus augmenting the forensic information acquired.

In addition to monitoring activities, the forensic agents 212*a-m*, 222, 224, and 242 preferably also package the monitored activities into event records. The event records typically include designators of the activities or events they are reporting (e.g. event descriptions and/or codes), as well as timing information, such as the time of the local device clock 236, the time received from the timestamp server, and/or vector clocks (described below in connection with FIG. 4). Records entries may alternatively be packaged by the local collector 230. Typically, each record entry includes monitored activities for only one domain, i.e., network, memory, or disk. Also, each record entry typically pertains to only a single machine instance, such as the instance of any of the virtual machines 210*a-m* or the instance of the physical machine 110 as a whole.

Event records from the various agents are sent to the local collector 230. The local collector 230 sends the event records to the collection engine 130, which in turn sends them to the recording unit 160 to be stored in data collections 170. In some examples, the local collector 230 may be omitted, and the agents 212*a-m*, 222, 224, and 242 may send event records directly to the collection engine 130.

The forensic agents 212*a-m*, 222, 224, and 242 may monitor network, memory, and disk activities according to any suitable schedule. In one example, activities are monitored, packaged, and sent to the collection engine 130 essentially in real time, as they occur. In other examples, network, memory, and disk activities are queued within the agents and reported at regular intervals. In still other examples, activities are queued and reported after a certain level of activity is reached, such as when a predetermined number of bytes are transferred, read, or written. In one particular example, network and disk activities are packaged and reported to the collection engine 130 as they occur, whereas memory activity is packaged and reported periodically, such as every hour. It has been observed that memory activities are frequent and involve a great deal of data. Therefore, preferred implementations generally do not report memory activities as they occur.

Figure 3:
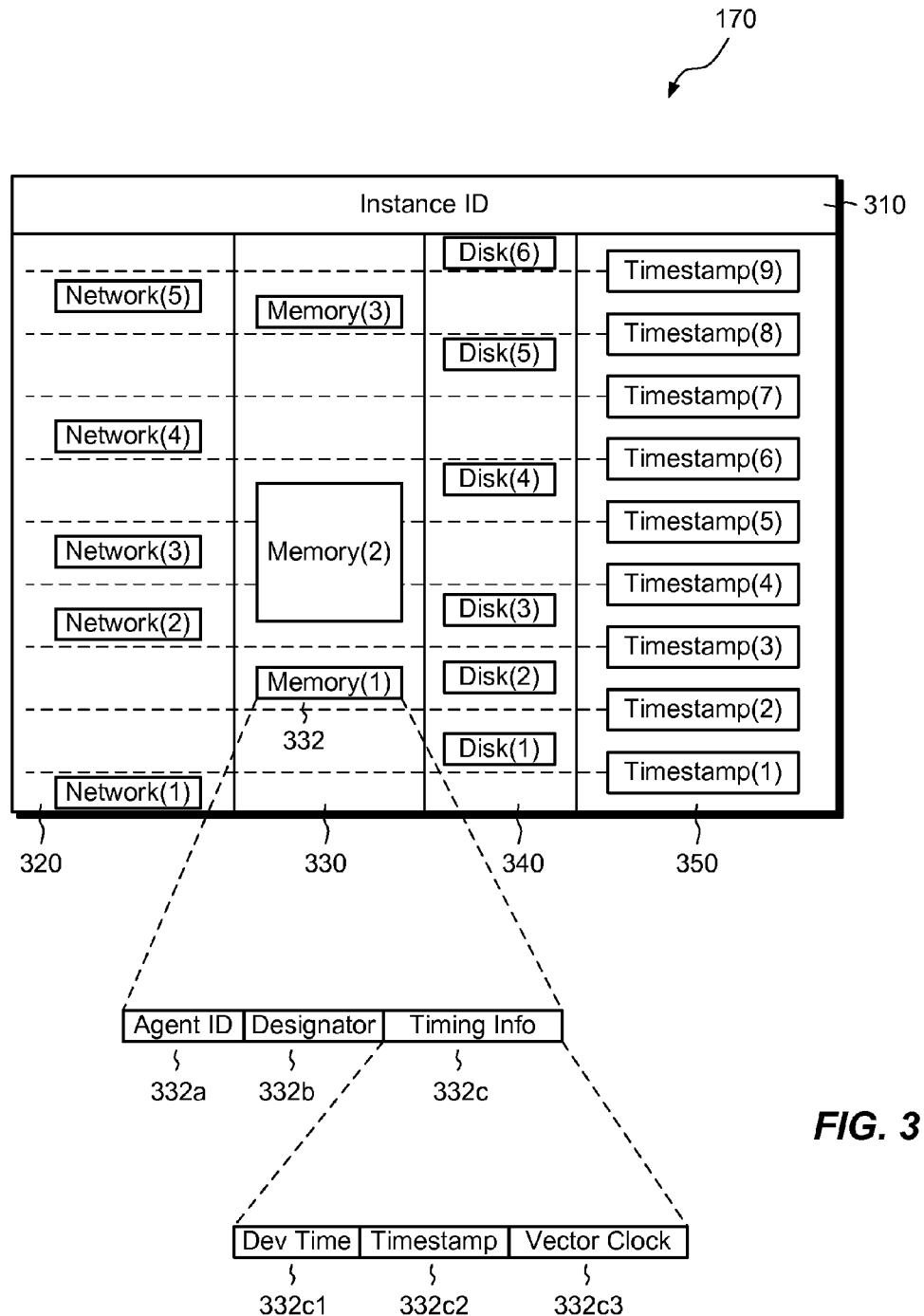
FIG. 3 is a diagram showing example event records received from a network agent, a memory agent, and a disk agent of FIG. 2, wherein the event records may include timing information, such as timestamps and a vector clock.

FIG. 3 shows an example arrangement of a data collection 170 of the recording unit 160. As shown, each data collection 170 stores a record 320 of network activities, a record 330 of memory activities, and a record 340 of disk activities for a particular machine instance. The record of network activities 320 includes individual network event records (e.g., Network(1)-Network(5)). Similarly, the record of memory activities 330 includes individual memory event records (e.g., Memory(1)-Memory(3)), and the record of disk activities 340 includes individual disk event records (e.g., Disk(1)-Disk(6)). The machine instance is identified with an instance identifier (ID) 310. In some examples, the instance ID 310 identifies a virtual machine instance, such as one of the virtual machines 210*a-m*, or a physical machine instance.

Event records for each machine instance are initially stored in the data collection 170 in the order received, so that the records 320, 330, and 340 approximately represent a respective sequence of events of the machine instance. In the example shown, timestamps 350 from the timestamp server 140 are applied at regular intervals relative to the records 320, 330, and 340. For example, a new timestamp 350 may be applied every second, every minute, or at some other interval. The data collection 170 is constructed such that timestamps 350 provide markers relative to each sequence of event records 320, 330, and 340. Each record entry can therefore be assigned to single time block, i.e., the time between two consecutive timestamps.

For certain event records, it may be desirable to indicate the duration of the underlying event. For example, the record entry "Memory(2)," indicating, for instance, a memory dump, is seen to extend across multiple time blocks. The record entry for "Memory(2)," or other event records extending across multiple time blocks, may include information indicating the duration of the event, which can then be represented in the data collection 170.

The illustrated event records in the records 320, 330, and 340 of FIG. 3 are not intended to be drawn to scale relative to one another or to the timestamps 350. For example, it may be typical for numerous network and/or disk event records to fall between adjacent timestamps. Also, event records for memory may occur less frequently than shown. It is therefore understood that FIG. 3 is merely illustrative of the general concepts involved.

FIG. 3 also shows example constituents of event records. For instance, event record 332, i.e., "Memory(1)," is seen to include an agent ID 332a, an event designator 332b, and a set of timing information 332c. The agent ID 332a identifies the particular agent (e.g., one of the agents 212a-m, 222, 224, and 242 from a particular machine) from which the record entry is received. The event designator 332b is a code and/or description of the event reported. The timing information 332c includes timestamp and/or sequence information. In some examples, the timing information 332c includes local device time 332c1 (e.g., the time reported by the device clock 236 on the machine 110a-n on which the agent runs, the most recent timestamp 332c2 received by the agent from the timestamp server 140, and a vector clock 332c3 maintained by the agent. The timing information 332 provides a source of information on which the resequencer 142 operates to correct the order and/or timing of event records reported in the recording unit 160.

In some examples, the different portions 332a, 332b, and 332c of the event records, including the portions of timing information 332c1, 332c2, and 332c3, can be used as indices for database queries by the forensic tools 150. For example, the forensic tools 150 may employ NoSQL database queries, or other column-centric queries, to access information about resequenced event records.

It is understood that different event records may include different timing information 332c. For example, some agents may not have access to a device clock 236 and therefore may not report device time 332c1. Also, some agents may not receive timestamps from the timestamp server 140 and thus may not include the timestamp information 332c2. Some agents may not participate in the set of vector clocks and thus may not include vector clock information 332c3. The timing information 332c should therefore be regarded as a flexible set of information, which can be different for different agents, but which in most cases provides some information that can be useful in correcting time and/or sequence errors in event records received.

As indicated, the event records shown in FIG. 3 are recorded in the order received; however, this ordering constitutes a merely rough ordering of the underlying events reported in the event records, as event records are typically variably delayed en route to the recording unit 160. For example, it is indicated that the event recorded in event record Disk(4) occurred before the event recorded in event record Network(4). If the underlying disk and network events actually occurred in the opposite order, forensic tools could miss important clues as to cause and effect related to malicious activity. If it could be known that suspect network activity, as reported in Network(4), actually occurred before suspect disk activity, as reported in Disk(4), then a connection could be drawn that the two events may be connected (e.g., that a virus infiltrated the network during the Network(4) event and propagated to the disk, as reported in the Disk(4) event).

The resequencer 142 can apply the timing information 332c from the different event records to correct many errors in the order in which events are reported. Correction of errors can be accomplished in diverse ways.

In some examples, the resequencer 142 can compare timestamp information 332c2 of different event records and reorder event records based on the timestamp information 332c2. Since the timestamp information 332c received across different event records all derives from the same timestamp server 140, ordering of event records according to timestamp information 332c2 generally produces more accurate results than ordering event records based on the time they are received by the recording unit 160, as variable latency in reporting event records from the agents to the recording unit 160 are eliminated.

Also, in some examples, the resequencer 142 can apply local device time 332c1 in reordering records. Although clocks 236 of different agents may drift relative to one another, the resequencer 142 can detect trends in the drift of clocks 236. For example, the resequencer 142 can compare device times 332c1 received with event records with timestamp information 332c2 from agents and/or with timestamps 350 applied by the recording unit 160. The resequencer 142 can then compute time offsets between device times 332c1 and timestamps 332c2 and apply the time offsets to compensate for timing errors. The resequencer 142 can then reorder event records based on corrected device times.

In some examples, event records arriving at the recording unit 160 from certain agents may include device time 332c1 but no timestamp information 332c2. In these instances, the resequencer 142 can access local log files of the agents (e.g., on the machines on which the agents are running), and search those log files for local log entries indicating that timestamps from the timestamp server 140 have been received. As those log entries also generally include timestamps for the local devices, the resequencer 142 can compare the local timestamps as reported in the log files with the events indicating receipt of timestamps from the timestamp server 140 to compute time offset errors, which the resequencer 142 can then apply in reordering event records received from such agents.

The resequencer 142 may use these techniques for correcting event order alone or in combination. In addition, numerous other techniques may be used. The above-described techniques are merely illustrative. The end product of the activities of the resequencer 142 is a reordered table of event records. The reordered table resembles the table of event records shown in FIG. 3; however, many errors in the order of event records are corrected. For example, the resequencer 142 may move event records to different time blocks from those originally assigned, and may transpose the order of various event records. The reordered sequence of event records is then stored in the recording unit 160, where it may be accessed for forensic analysis by the forensic tools 150, or for display to a user.

In some examples, the resequencer 142 operates by applying different reordering techniques in sequence. For instance, the resequencer 142 may create one or more intermediate tables. Each intermediate table stores a different reordering pass. For example, the resequencer 142 may create a first intermediate table to reflect reordering of event records based on local device time 332c1. The resequencer may then create another intermediate table to reflect reordering of event records based on timestamp information 332c2. Any number of intermediate tables may be created to reflect different passes at resequencing event records.

In addition to the above-described techniques for correcting the order of event records, the resequencer 142 may also employ a set of vector clocks. As is known, vector clocks provide a means for determining sequences of events in a distributed system. Typically, vector clocks do not use device clocks for ordering events but rather a messaging protocol established among different members.

Figure 4:
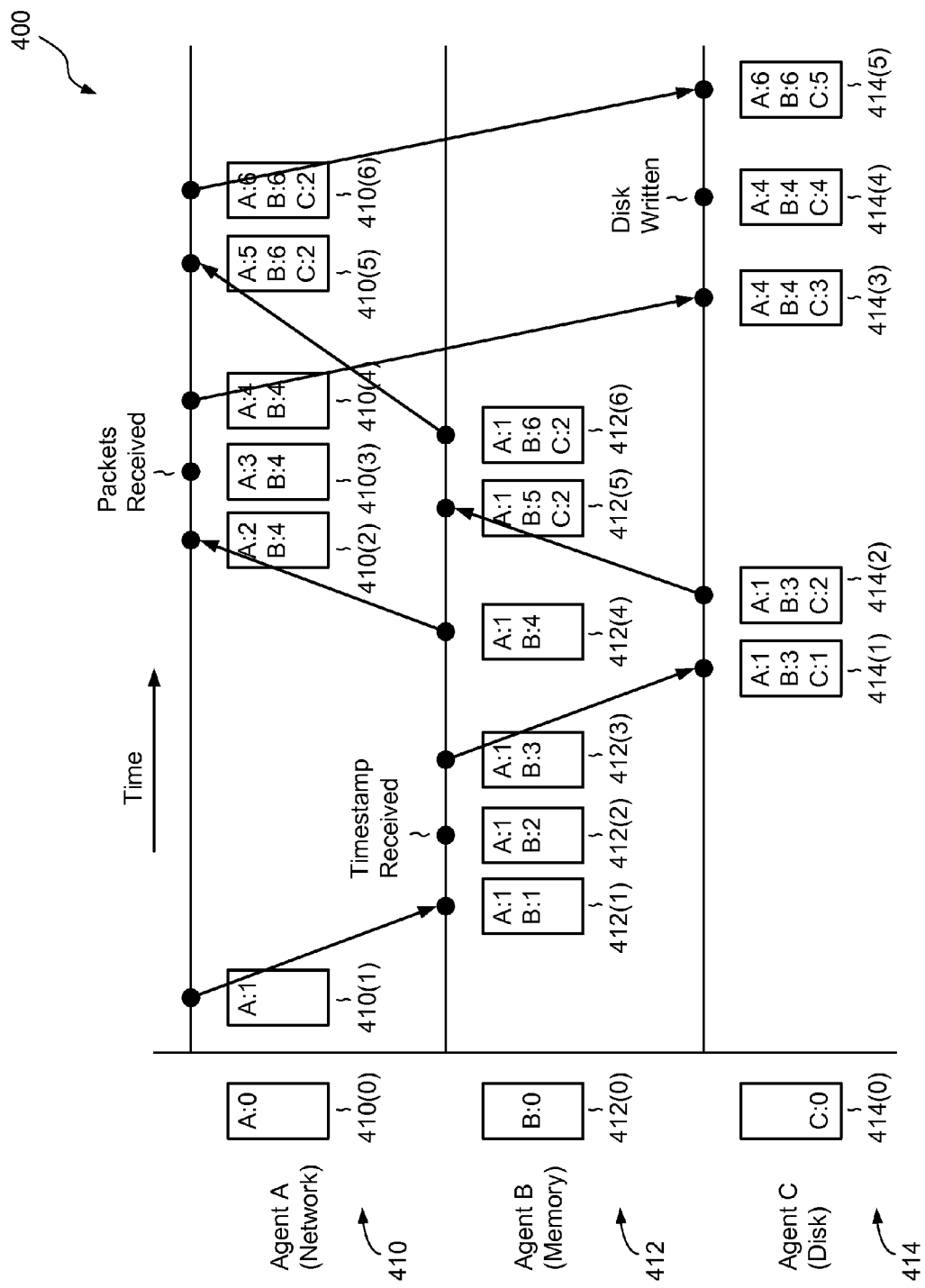
FIG. 4 is an activity diagram of an example set of vector clocks maintained by network, memory, and disk agents.

FIG. 4 shows an example set of vector clocks 400 for use in the electronic system 100. Here, multiple forensic agents of the electronic system 100 (e.g., all agents) each include a local vector clock. For simplicity, only three agents are shown, i.e., Agent A, Agent B, and Agent C. In this example, Agent A is a network agent with a vector clock 410, Agent B is a memory agent with a vector clock 412, and Agent C is a disk agent with a vector clock 414.

Although the vector clocks may be implemented in numerous ways, the example set of vector clocks 400 uses the following protocol. Each agent has a vector clock that includes an array of multiple logical clocks, one for each participating agent. For example, in the set of vector clocks 400, each agent stores a vector clock of three logical clocks, one for each of Agents A, B, and C.

Initially, as indicated with vector clocks 410(0), 412(0), and 414(0), all clocks are set to zero. Each time an agent prepares to send a message to another agent, it increments its own logical clock by one. For example, when Agent A prepares to send a message to Agent B, Agent A increments its own logical clock by one (the value of "A" changes from zero to one between 410(0) and 410(1)). The sending agent then sends its entire vector clock to the receiving agent.

Similarly, each time an agent receives a message, it increments its own logical clock in its respective vector clock by one. For example, Agent B, upon receiving the message sent from Agent A in 412(1), increments its own logical clock in its vector clock 412 by one (the value of "B" changes from zero to one between 412(0) and 412(1)). Each time an agent receives a message, the agent also updates the logical clock in each element of its vector clock by taking the maximum of the value for that element in its own vector clock and the value of that element in the vector clock it receives. For example, Agent B, upon receiving Agent A's vector clock in 412(1), updates its own vector clock by changing the value of "A" to one.

In addition, each time an agent experiences an event recognized by its respective vector clock, the agent increments its own logical clock by one. For example, in 412(2), Agent B (a memory agent) increments the value of "B" by one in Agent B's vector clock 412 when Agent B registers an event indicating receipt of a timestamp from the timestamp server 140. Similarly, in 410(3), Agent A (a network agent) increments the value of "A" by one in Agent A's vector clock 410 when Agent A registers an event indicating that packets are received over the network 112. Also, in 414(4), Agent C (a disk agent) increments the value of "C" by one in Agent C's vector clock 414 when Agent C registers an event indicating that a disk is written.

With this protocol, agents can communicate their own event status to other agents in a gossip-like arrangement. Agents can also communicate the event status of other agents from which they have received messages.

In addition to storing numbers representing events of various agents, the vector clocks 410, 412, and 414 preferably also store additional content, such as codes or descriptions of the events they register. For example, vector clock 412 can store a message in connection with the transition of "B" from one to two (412(1) to 412(2)). In the example shown, the message might take the form, "Timestamp received from timestamp server 140: Mar. 8, 2012 12:11:56.12 PM." Later, when Agent C receives a message from Agent B at 414(1), the message will include the above event description pertaining to Agent B. Agent C will thus be informed at 414(1) not only of the number of events Agent B has experienced, but also the nature of those events. The information can then be forwarded to other agents. A rich set of information pertaining to agent events can therefore be passed among agents. This set of information can be accessed by the resequencer 142 to obtain very precise information about sequences of events occurring among agents.

Agents can send messages to other agents at a high rate of speed. For example, agents can send hundreds or even thousands of messages during the time interval between two consecutive timestamps received from the timestamp server 140. Although the messages sent between agents do not necessarily include time information, their sequence information is precise. Therefore, the set of vector clocks 400 can be used to provide accurate information about event sequences, even for events happening at a much higher rate than the frequency of updates from the timestamp server 140.

As indicated in the example above, in which Agent B registers receipt of a timestamp, timestamps from the timestamp server 140 can be registered as vector clock events. If the values of the timestamps are stored, the resequencer 142 can apply such timestamp values as references to correlate events stored in the vector clocks with particular instants in time. By operating in conjunction with the timestamp server 140, the set of vector clocks 400 can thus provide both precise sequence information and precise time information.

The set of vector clocks 400 can be used to trace the propagation of activities, including malicious activities, around different parts of the electronic system 100. For example, Agent A (a network agent) can register an event in its vector clock 410 indicating that packets are received over the network 112 (i.e., at 410(3)). If the electronic system 100 is under malicious attack, such packets may contain a computer virus. Sometime after the packets are received, Agent C (a disk agent) may register an event on its vector clock 414 indicating that the disk is being written (i.e., at 414(4)). If, at sometime between the packets being received at 410(3) and the disk being written at 414(4), Agent A sends a message to Agent C (i.e., the message between 410(4) and 414(3)), then the vector clock 414 of Agent C obtains a clear record that packets were received before disk was written. Here, this sequence of events, and other recorded sequences captured by the set of vector clocks 400, may provide critical forensic evidence for tracing the propagation of the virus. Other events and activities may similarly be traced.

Although the set of vector clocks 400 provides accurate sequence information, it is understood that the information provided is not necessarily complete. For example, to identify sequences of events from vector clocks, it is required that messages be sent between certain agents at certain times. For example, the vector clock 414 of Agent C only includes information about packets received by Agent A because a message was sent between Agent A and Agent C (410(4) to 414(3)) between these two occurrences.

The resequencer 142 thus applies sequence and/or time information from the set of vector clocks 400 to reorder event records when such information is available. When sequence information pertaining to certain events is not available from the set of vector clocks 400, the resequencer 142 may instead apply other information, such as the timestamps and/or device clocks described in connection with FIG. 3. Preferably, the resequencer 142 integrates information from the set of vector clocks 400, the timestamps, and the device clocks to accurately correct sequencing errors in event records.

Figure 5:
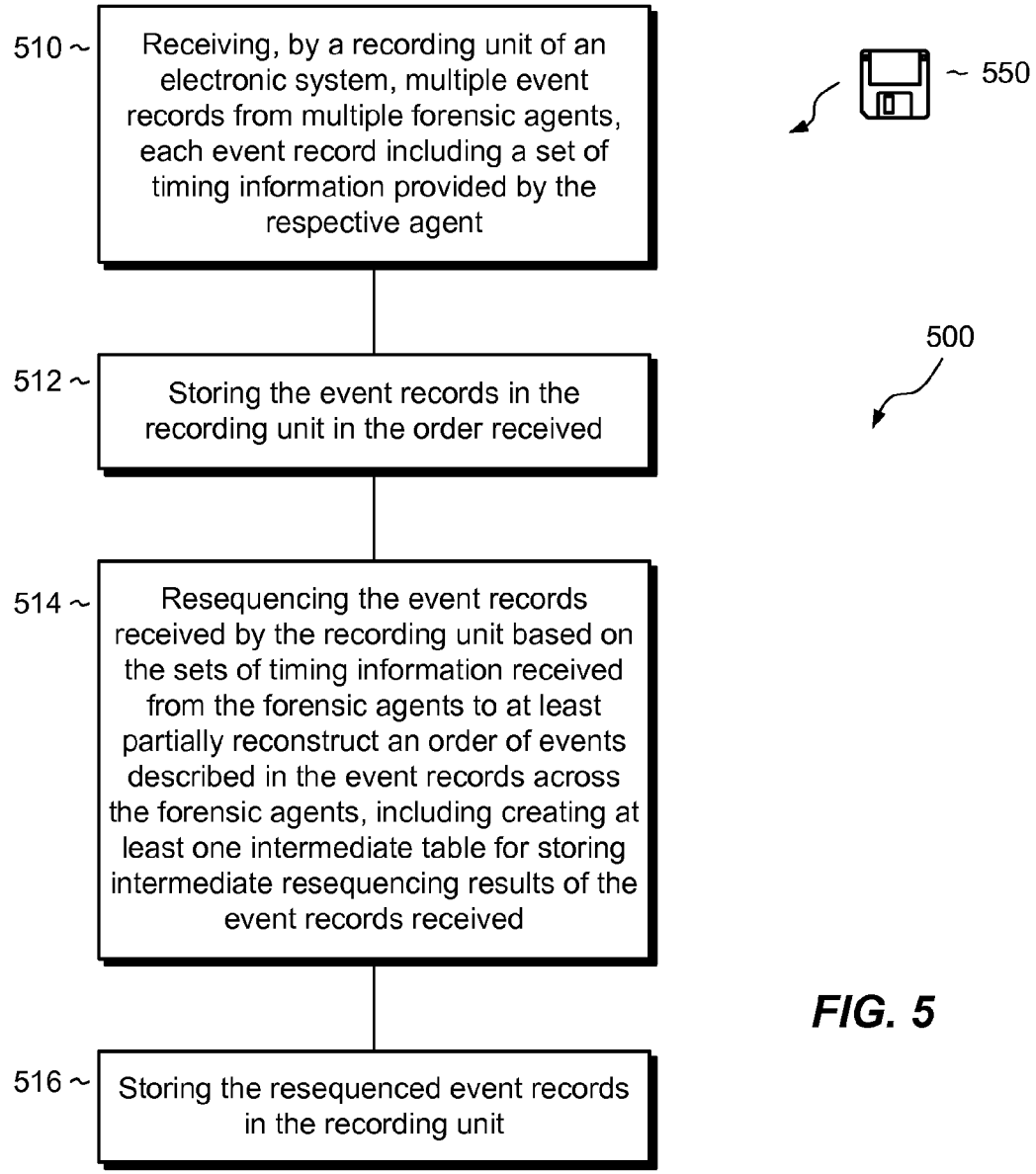
FIG. 5 is a flowchart showing an example process for receiving event records from different agents and resequencing the event records based on timing information received with the event records.

FIG. 5 shows an example process 500 for ordering events captured by multiple forensic agents running in the electronic system 100. At step 510, the recording unit 160 receives multiple event records from multiple forensic agents. Each event record received includes a set of timing information provided by the respective agent. The timing information may include time and/or sequence information, such as timestamp information from the agent received from the timestamp server 140, device time obtained by the agent from a local device clock 236, and/or vector clock information (e.g., a vector clock of the agent).

At step 512, the received event records are stored in the recording unit in the order the event records are received. In some examples, the recording unit 160 stores event records in connection with time blocks, where time blocks are defined by consecutive timestamps received by the recording unit 160 from the timestamp server 140. The event records may be stored to disk, solid state memory, or some other storage medium. In some examples, event records are stored in volatile memory of the recording unit 160, such as in a memory cache.

At step 514, the event records received by the recording unit 160 are resequenced based on the sets of timing information received from the forensic agents, to at least partially reconstruct an order of events described in the event records across the forensic agents. For example, the resequencer 142 may access the stored event records and apply the timestamp information obtained from the agents, the device times obtained from the agents, and/or the agents' vector clocks. In some examples, resequencing event records includes creating at least one intermediate table for storing intermediate resequencing results. Resequencing can thus proceed in multiple passes, where the resequencer 142 applies different information and/or sorting algorithms to progressively correct the ordering of events.

At step 516, the resequenced event records are stored in the recording unit 160. The resequenced records can then be displayed to a user, or accessed by the forensic tools 150 to perform forensic analysis on data collected.

The process 500 is typically performed by the software constructs described in connection with FIG. 1, which reside in the memory 122 of the computing system 120 and are run by the set of processors 124. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

Improved techniques have been described for logging events in an electronic system 100. The technique includes receiving event records by a recording unit 160 from multiple forensic agents of the electronic system 100 and applying timing information 332c included within the event records to resequence the event records in the recording unit 160 in a more accurate order. In some examples, the timing information 332c includes a set of vector clocks 400 established among the agents for storing sequences of events. By resequencing the event records received by the recording unit 160, the improved technique allows more accurate and effective forensic analysis of events.

It should be appreciated that the techniques described herein can be used for forensic analysis of both physical machines and virtual machines. These techniques are particularly advantageous, however, in virtual machine environments, where virtual machines may be continually created and overwritten, leaving behind little evidence on which forensic analysis can otherwise be performed.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although correction of time and/or sequence errors has been shown and described in connection with network activities and storage activities, this is merely an example. Event records for other types of activities may also reordered using the techniques disclosed herein.

Also, it is shown and described that event records are organized in data collections 170 of the recording unit 160, where each data collection stores event records for a single machine instance. This is merely an example, however. Alternatively, event records may be stored in collections holding event records for multiple machines, including all machines that are part of the electronic system 100. With this alternative arrangement, forensic tools can operate on resequenced records for multiple machines, allowing suspect activity to be traced from one machine to another.

Also, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of ordering events captured by multiple forensic agents running in an electronic system, comprising:

receiving, by a recording unit of the electronic system, multiple event records from the forensic agents, each event record including a set of timing information provided by the respective agent;

storing the event records in the recording unit in the order received;

resequencing the event records received by the recording unit based on the sets of timing information received from the forensic agents to at least partially reconstruct an order of events described in the event records across the forensic agents; and storing the resequenced event records in the recording unit, wherein the recording unit and the forensic agents each receive periodic timestamps from a timestamp server, wherein at least one forensic agent stores an event in a vector clock that records receipt of at least one of the timestamps from the timestamp server, the vector clock established among the forensic agents, and wherein resequencing the event records received by the recording unit includes correcting for timing errors in the event records based on differences between timestamps reported in the vector clock and timestamps received by the recording unit.

2. The method of claim 1, wherein the multiple forensic agents include at least one network agent that monitors network activity of the electronic system and at least one storage agent that monitors storage activity of the electronic system.

3. The method of claim 2, wherein resequencing the event records includes reordering event records received from a network agent relative to event records received from a storage agent.

4. The method of claim 2, wherein the sets of timing information included in the event records received from the forensic agents include the vector clock established among the forensic agents.

5. The method of claim 4, wherein resequencing the event records received by the recording unit includes applying the vector clock received from the forensic agents to correct for timing errors in reporting event records to the recording unit.

6. The method of claim 5, wherein applying the vector clock received from the forensic agents to correct for timing errors includes comparing events in the vector clock with at least one timestamp received by the storage unit.

7. The method of claim 4, wherein vector clock information is received by the recording unit in the timing information provided with event records from different forensic agents, the vector clock information for each such record entry including a multi-element clock maintained by the forensic agent from which the record entry is received, the multi-element clock including a logical clock of the forensic agent as well as the logical clock of at least one other forensic agent.

8. The method of claim 2, wherein the set of timing information received with an event record includes a local device time of a device of the electronic system on which the forensic agent that produces the event record is running.

9. The method of claim 8, further comprising the recording unit applying the most recent timestamp received from the timestamp server to each event record received by the recording unit at the time the recording unit receives the event record.

10. The method of claim 9, further comprising the recording unit receiving timestamps pushed to the recording unit from the timestamp server and the recording unit pulling timestamps from the timestamp server by issuing requests for timestamps to the timestamp server.

11. The method of claim 9, wherein the sets of timing information received by the recording unit from the forensic agents include the most recent timestamps received from the timestamp server by the respective forensic agents.

12. The method of claim 2, wherein resequencing the event records includes creating at least one intermediate table for storing intermediate resequencing results of the event records received.

13. The method of claim 12, wherein at least one sorting operation includes correcting for a time offset between event records from a first of the forensic agents having a first set of timestamps and event records from a second of the forensic agents having a second set of timestamps.

14. The method of claim 2, wherein storing the resequenced event records includes providing the event records in the form of parameter-value pairs, wherein the values of the parameter-value pairs form indices for NoSQL database queries.

15. An apparatus for ordering events captured by multiple forensic agents running on an electronic system, comprising:
a set of processors;
memory, coupled to the set of processors, the memory constructed and arranged to store instructions executable by the set of processors; and
a recording unit coupled to the memory and the set of processors,
wherein the set of processors executing instructions from the memory forms a specialized circuit constructed and arranged to:
receive, by a recording unit of the electronic system, multiple event records from the forensic agents, each event record including a set of timing information provided by the respective agent;
store the event records in the recording unit in the order received;
resequence the event records received by the recording unit based on the sets of timing information received from the forensic agents to at least partially reconstruct an order of events described in the event records across the forensic agents; and
store the resequenced event records in the recording unit,
wherein the specialized circuit is further constructed and arranged to cause the recording unit and the forensic agents each to receive periodic timestamps from a timestamp server,
wherein the specialized circuit is further constructed and arranged to cause at least one forensic agent to store an event in a vector clock that records receipt of at least one of the timestamps from the timestamp server, the vector clock established among the forensic agents, and
wherein, when resequencing the event records received by the recording unit, the specialized circuitry is constructed and arranged to correct for timing errors in the event records based on differences between timestamps reported in the vector clock and timestamps received by the recording unit.

16. The apparatus of claim 15, wherein the sets of timing information included in the event records received from the forensic agents include the vector clock established among the forensic agents.

17. The apparatus of claim 15, wherein, when the specialized circuit is configured to resequence the event records received by the recording unit, the specialized circuit is further configured to correct for timing errors in event records by comparing events in the vector clock with at least one timestamp received by the storage unit.

18. A non-transitory computer readable medium including instructions which, when executed by a set of processors, cause the set of processors to perform a method for ordering events captured by multiple forensic agents running in an electronic system, the method comprising:
receiving, by a recording unit of the electronic system, multiple event records from the forensic agents, each event record including a set of timing information provided by the respective agent;
storing the event records in the recording unit in the order received;
resequencing the event records received by the recording unit based on the sets of timing information received from the forensic agents to at least partially reconstruct an order of events described in the event records across the forensic agents; and storing the resequenced event records in the recording unit,
wherein the recording unit and the forensic agents each receive periodic timestamps from a timestamp server,
wherein at least one forensic agent stores an event in a vector clock that records receipt of at least one of the timestamps from the timestamp server, the vector clock established among the forensic agents, and
wherein resequencing the event records received by the recording unit includes correcting for timing errors in the event records based on differences between timestamps reported in the vector clock and timestamps received by the recording unit.

19. The non-transitory computer readable medium of claim 18, wherein the sets of timing information included in the event records received from the forensic agents include the vector clock established among the forensic agents.

20. The method of claim 1, further comprising performing a forensic analysis on the resequenced event records stored in the recording unit.

* * * * *